United States Patent [19]

Endo

[11] Patent Number: 4,812,020
[45] Date of Patent: Mar. 14, 1989

[54] OPTICAL INFORMATION RECORDING AND REPRODUCING APPARATUS

[75] Inventor: Kiyonobu Endo, Yokohama, Japan

[73] Assignee: Canon Kabushiki Kaisha, Tokyo, Japan

[21] Appl. No.: 195,090

[22] Filed: May 17, 1988

[30] Foreign Application Priority Data

May 20, 1987 [JP] Japan ................... 62-124956

[51] Int. Cl.$^4$ ............................................. G02B 3/00
[52] U.S. Cl. ..................................................... 350/409
[58] Field of Search ............... 350/409, 432, 433, 434, 350/435

[56] References Cited

U.S. PATENT DOCUMENTS 4,253,735  3/1981  Kawamura et al. ............ 350/433 X
4,564,268  1/1986  Tatsuno et al. .................... 350/409

Primary Examiner—John K. Corbin
Assistant Examiner—Scott J. Sugarman
Attorney, Agent, or Firm—Fitzpatrick, Cella, Harper & Scinto

[57] ABSTRACT

An optical information recording and reproducing apparatus comprises: a laser light source having a Gaussian intensity distribution of an emitted laser beam; an optical system for focusing the laser beam emitted from said laser light source, having a number of aperture NA represented by $$NA > \frac{0.82 \times \lambda}{\omega_0}$$

wherein $\lambda$ is a wavelength of the laser beam emitted by said laser light source, and $\omega_0$ is a diameter of a laser beam spot focused by said optical system.

3 Claims, 5 Drawing Sheets

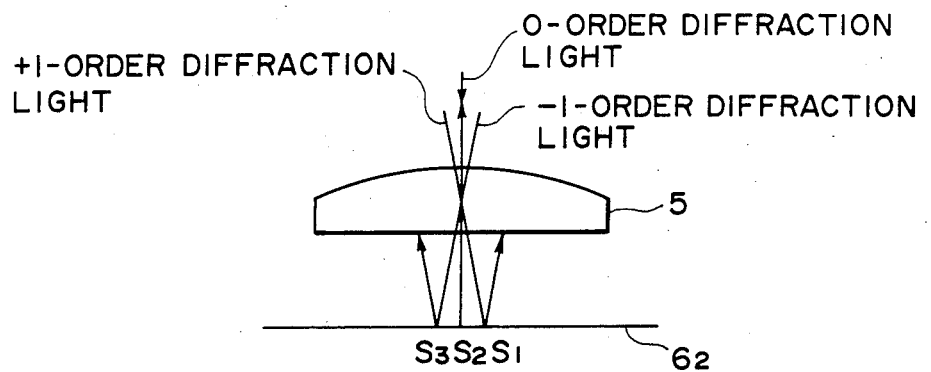
F I G. 5A
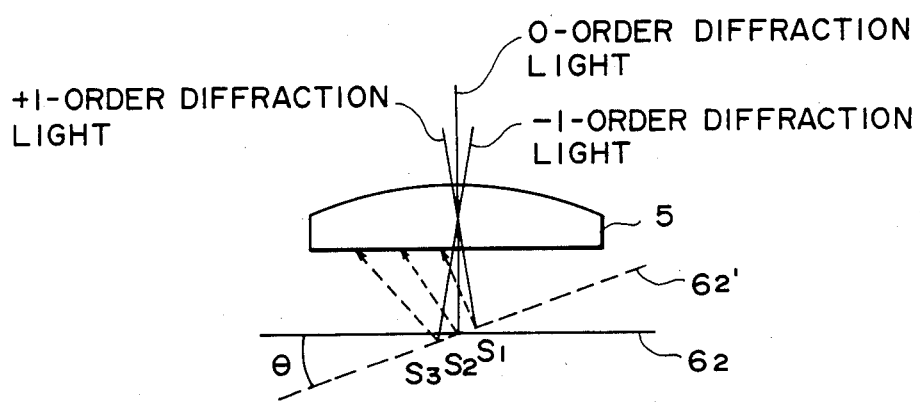
F I G. 5B

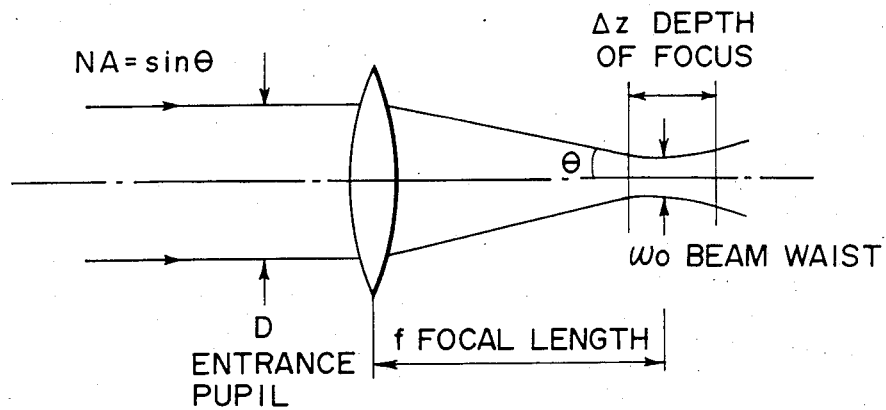
F I G. 6
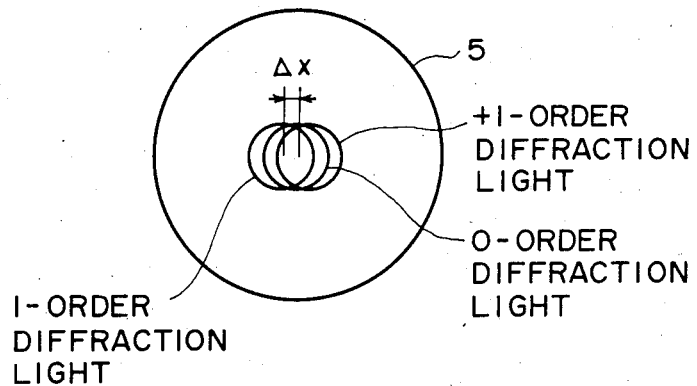
F I G. 7A
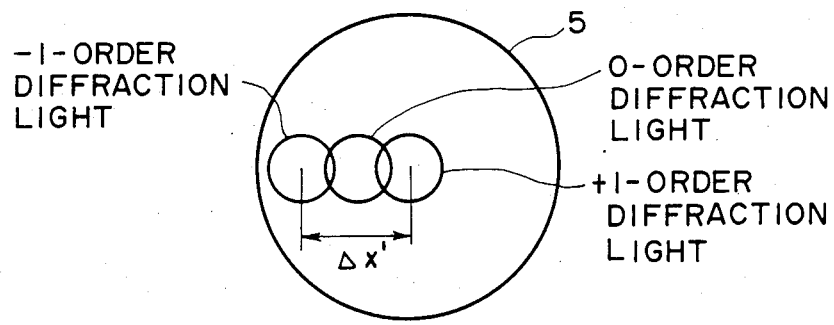
F I G. 7B

OPTICAL INFORMATION RECORDING AND REPRODUCING APPARATUS

BACKGROUND OF THE INVENTION

1. Field of the Invention

The present invention relates to an optical information recording and reproducing apparatus which has a semiconductor laser as a light source, directs a laser beam of the semiconductor laser to an optical information recording medium by an optical system to record information, reproduce information recorded on the medium and/or erasing the information recorded on the medium.

2. Related Background Art

Commercialization, research and development of the optical information recording and reproducing apparatus such as compact disk, rewritable electronic file system and optical disk system which uss an erasable opto-magnetic material or phase transition type material have recently been actively being conducted. An optical card system for recording and reproducing information on and from a card-like optical recording medium (hereinafter referred to as an optical card) has been recently being noticed. The optical card is characterized by that it is easy to carry and that it has a larger information capacity than a disk (in which a center area is not used for recording information).

The surface of the optical recording medium is scanned by a light beam modulated with record information and focused into a fine spot so that information is recorded thereon as optically detectable record pit train (information track). In order to exactly record information without trouble of crossing of information tracks, it is necessary to control the irradiation position of the light beam in a direction normal to the scan direction in a plane of the optical card (This is hereinafter called an auto-tracking AT). In order to irradiate the light beam as a stable fine spot irrespective of warp or mechanical tolerance of the optical card, it is necessary to control the irradiation position in a normal direction to the plane of the optical card (This is called an auto-focusing AF).

FIG. 1 shows an optical head used in a prior art optical information recording and reproducing apparatus which uses an optical card.

In FIG. 1, a light beam emitted from a light source 1 such as a semiconductor laser is collimated by a collimater lens 2 and split into three beams by a diffraction grating 3. A 0-order diffraction light is used to record and reproduce information and detect an AF error signal, and ±1 - order diffraction lights are used to detect an AT error signal. The split light beams are reflected by a beam splitter 4 and directed to an optical card 6 by an objective lens 5 to form three beam spots $S_1$, $S_2$ and $S_3$. The light beams reflected by the optical card 6 again pass through the objective lens 5 and the beam splitter 4 so that they are separated from the incident beams. The reflected beams are reflected by a mirror 7 and focused by a sensor lens 8 and a cylindrical lens 9 and directed to photo-sensors $10_1$, $10_2$ and $10_3$, which are arranged to receive the lights from the beam spots $S_1$, $S_2$ and $S_3$, respectively.

A photo-sensing plane of the photo-sensor $10_2$ is divided into four sections as shown in FIG. 2, and sums of detection signals of a pair of diagonally arranged photo-sensing sections are differentiated to detect an astigmatism introduced by the cylindrical lens 9 and produce a focusing signal by a known principle of astigmatism method. When information is to be reproduced, the photo-sensor $10_2$ produces a reproduced signal. The signals detected by the photo-sensors $10_1$ and $10_3$ are differentiated by a differential amplifier 11 which produces a tracking signal ST at a terminal 12. The tracking signal ST is fed back to a lens actuator through a circuit not shown, and an objective lens 5 is moved normally to an optical axis to effect the auto-tracking.

The optical card 6 is reciprocally moved normally to an arrow R, that is, normally to the plane of drawing of FIG. 1 by a drive mechanism not shown so that the light spots $S_1$, $S_2$ and $S_3$ scan the optical card 6. The optical head 19 including the optical system is movable in the direction R to permit track access.

In the prior art optical head, the objective lens 5 receives a light beam which is of substantially equal size to an aperture of the lens 5, as shown in U.S. Pat. No. 3,957,630 in order to reduce a proportion of that light beam diffracted by the optical information pattern (pits) on the recording medium which again passes through the objective lens and reaches the photo-detector so that a contrast of the photoelectrically detected signal is enhanced.

FIG. 3 illustrates the method described above. In FIG. 3, a light beam 100 applied to the objective lens 5 has a light beam diameter which is substantially equal to the aperture of the objective lens 5, and it is focused onto an information recording medium plane $6_2$ of the optical card 6 by the objective lens 5 to form three beam spots $S_1$, $S_2$ and $S_3$. A transparent protective layer $6_1$ is formed on the information recording medium plane $6_2$. Of the three beam spots, the beam spot $S_2$ is considered. If there is a pit $6_3$ on the information recording medium plane $6_2$, the reflected light beam produces a diffraction light 200 which is again directed to the objective lens 5. The light beams which pass through the objective lens 5 and are directed to the photo-sensors not shown are those light beams which are within the aperture of the objective lens 5, and the diffracted light 200 outside the aperture do not pass through the objective lens 5. When there is no pit $6_3$, no diffracted light 200 is produced and almost all of the reflected light beams pass through the objective lens 5. Accordingly, the smaller the amount of the diffracted lights 200 which pass through the objective lens 5 is, that is, the smaller the aperture of the objective lens 5 is, (more precisely, the smaller the NA of the objective lens 5 is), the larger is the contrast of the photo-electrically produced signal.

The optical card 6 is usually made of a flexible material such as polycarbonate, vinyl chloride resin or acrylic resin, the optical card is warped or bent after long time use if, for example, mechanical pressure or heat is applied during storage. If the deformed optical card is used to record or reproduce information, various problems arise. These are explained below.

FIGS. 4A and 4B illustrate the problems and they show a portion of the apparatus of FIG. 1. The like elements to those shown in FIGS. 1 and 3 are designated by the like numerals. As shown in FIG. 4A, if the information recording medium plane $6_2$ of the optical card 6 is normal to the center light beam of the 0-order diffracted light, the reflected lights of the 0-order diffracted light and the ±1-order diffracted lights pass through the objective lens 5. If the recording medium plane $6_2$ inclines by an angle $\theta$ is shown by $6_2'$ in FIG. 4B, the reflected light of the −1-order diffracted light on one side does not pass through the objective lens 5. Thus, the amount of light applied to the photo-sensors $10_1$ and $10_3$ shown in FIG. 5 changes with the inclination of the medium plane $6_2$ and an error signal which erroneously indicates tracking error is produced. Accordingly, it is difficult to attain correct auto-tracking because of the inclination of the recording medium plane $6_2$.

SUMMARY OF THE INVENTION

It is an object of the present invention to provide an optical information recording and reproducing apparatus which resolves the problems encountered in the prior art apparatus and allows stable auto-tracking even with an inclined information recording medium plane.

The above object of the present invention is achieved in an optical information recording and reproducing apparatus which focuses a laser beam from a semiconductor laser onto an optical information recording medium by an optical system to record information, reproduce information recorded on the medium and or erase information recorded on the medium, by selecting a number of aperture NA of the optical system to be larger than $0.82\lambda/\omega_O$ where $\lambda$ is a wavelength of the semiconductor laser and $\omega_O$ is a diameter of a laser beam spot focused by the optical system.

BRIEF DESCRIPTION OF THE DRAWINGS

FIG. 6 illustrates a relationship between a beam waist and an NA, and FIGS. 7A and 7B illustrate an incident light beam to an aperture plane (pupil plane) of a lens.

DETAILED DESCRIPTION OF THE PREFERRED EMBODIMENTS

Figure 1:
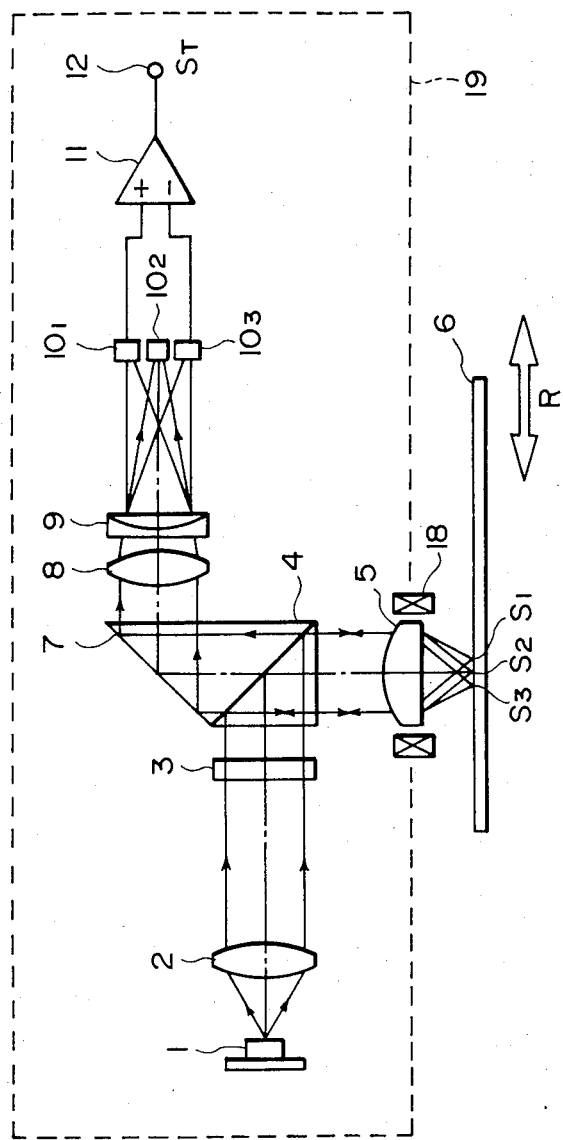
FIG. 1 shows a configuration of a prior art optical information recording and reproducing apparatus.
Figure 2:
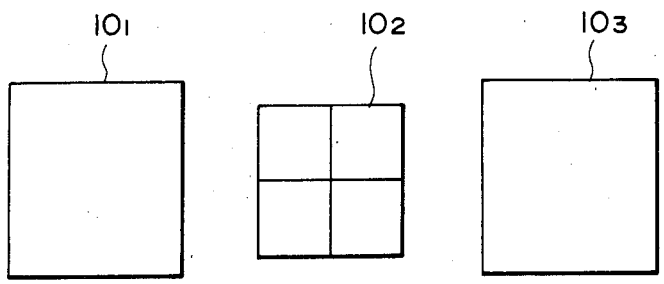
FIG. 2 shows a photo-sensing plane of a photosensor.
Figure 3:
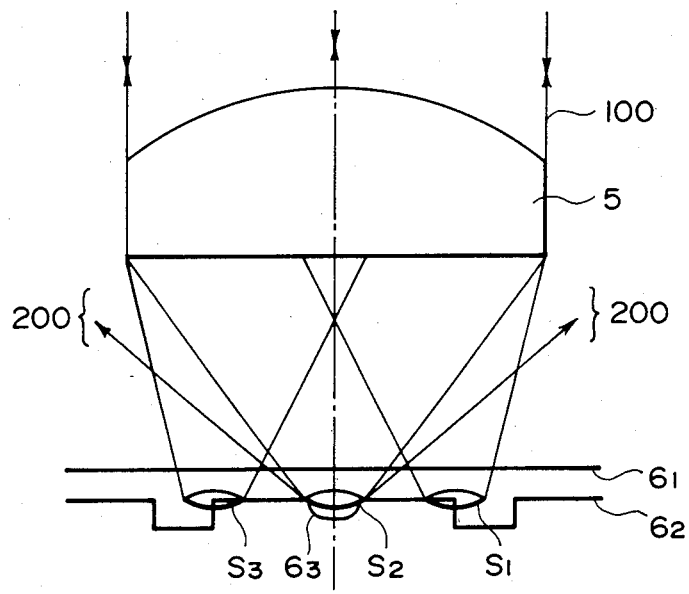
FIGS. 3, 4A and 4B show partial enlarged views of the optical information recording and reproducing apparatus shown in FIG. 1, FIGS. 5A and 5B show one embodiment of the optical information recording and reproducing apparatus of the present invention.

FIGS. 5A and 5B illustrate the optical information recording and reproducing apparatus of the present invention, and they show a portion of the apparatus shown in FIG. 1. The like elements shown in FIGS. 1 and 3 are designated by the like numerals. An objective lens used in the present embodiment has a larger aperture than that of the prior art apparatus. Accordingly, reflected lights of 0-order diffracted light and ±1-order diffracted lights pass through the objective lens 5 whether an information recording medium plane $6_2$ of an optical card 6 is normal to a center light beam of the 0-order diffracted light as shown in FIG. 5A or the medium plane $6_2$ inclines by an angle $\theta$ as shown by $6_2'$ in FIG. 5a, so that stable auto-tracking is attained.

The number of aperture of the objective lens required for the stable auto-tracking is discussed below.

Assuming that an energy distribution function of the light emitted from the laser is Gaussian, a beam system $\omega(Z)$ is represented by $$\omega(Z) = \omega_0 \sqrt{1 + (\lambda Z/\pi \omega_0)^2}$$

where $\omega 0$ is a beam waist, $\lambda$ is a wavelength of an incident light, and Z is a distance from the beam waist. In FIG. 6, f is a focal distance of the lens and D is a diameter of a collimated beam applied to the lens. Then, the number of aperture NA of the lens is represented by NA=sin $\theta$ (if $\theta$ is small, sin $\theta \sim$ tan $\theta$ =D/f) The beam waist, that is, the spot size $\omega_0$ at the focal point is represented by $$\omega 0 \approx k\frac{\lambda}{NA} = k\frac{\lambda}{\sin\theta} = k\frac{\lambda \sqrt{4f^2 + D^2}}{D}$$

($k = 0.82$ for Gaussian)

Figure 4A:
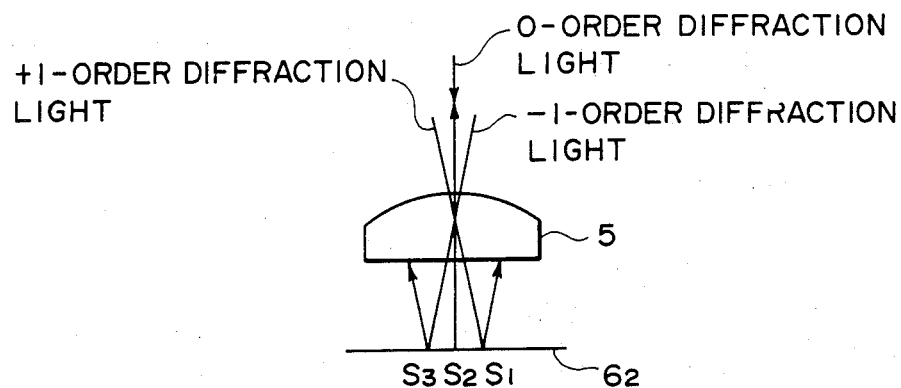
Figure 4B:
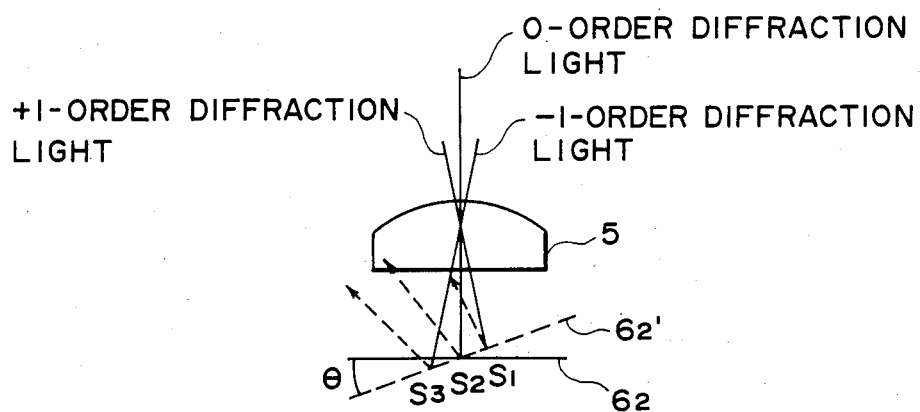

Accordingly, when the semiconductor laser beam having the wavelength $\lambda=830$ nm is used to obtain a beam spot size of 3.0 $\mu$m, a lens having NA=0.23 is required. If the focal distance of the lens is f=4mm, the aperture diameter of the lens required is 1.9 mm. As explained in FIGS. 4A and 4B, if the aperture diameter of the lens is 1.9 mm, the reflected light beams are blocked by the objective lens even by a slight inclination of the recording medium and exact auto-tracking is not attained. This problem is resolved by using the objective lens having a large aperture diameter and selecting the diameter of the incident light beam to the diameter which assures necessary beam spot size (1.9 mm in the present embodiment) as shown in FIG. 5A. Namely, a lens which meets

NA>0.82 ×λ/ω0 is used, where $\lambda$ is the wavelength of the laser beam emitted from the laser light source, $\omega_0$ is the spot diameter of the laser beam focused by the lens and NA is the number of aperture of the lens.

A three-beam method is now explained in detail.

FIGS. 7A and 7B illustrate an incident light beam to an aperture plane (pupil plane) of the objective lens when the recording medium is inclined as shown in FIG. 5B. FIG. 7A illustrates an incident light beam to the objective lens 5 from the semiconductor laser, and FIG. 7B illustrates an incident light beam to the objective lens from the recording medium. Assuming that the inclination $\theta$ of the recording medium is 2 degrees, a diffraction angle of the ±1-order diffracted lights in FIG. 7A is 0.5 degree, a distance $\Delta x$ between the center light beam of the −1-order diffracted light and the optical axis of the lens 5 on the aperture plane (pupil plane) of the objective lens 5 is 0.5 mm, and the focal distance f of the lens is 4 mm, then a distance $\Delta x'$ between the center light beam of the −1-order diffracted light and the optical axis of the lens 5 on the aperture plane (pupil plane) of the objective lens 5 is 0.85 mm. When the inclination $\theta$ of the recording medium is 3 degrees, $\Delta x'$ is 1 mm. Accordingly, when the light beam diameter of the incident ±1-order diffracted light is 1.9 mm, the blocking of the reflected light beam from the recording medium is prevented if the aperture diameter of the lens is 3.6 mm when the inclination $\theta$ of the recording medium is 2 degrees, and if the aperture diameter of the lens is 3.9 mm when the inclination $\theta$ of the recording medium is 3 degrees. The required numbers of aperture NA of the lens are 0.41 and 0.44, respectively, when the focal distance f of the lens is 4 mm. When the beam spot size of 3 $\mu$m on the recording medium plane is required and the objective lens having NA=0.5 is used, the stable auto-tracking is attained if the inclination of the recording medium plane is less than 3 degrees. By considering the inclination $\theta$ of the recording medium plane as one of parameters, the lens which meets the following relationship may be used.

$$NA > \frac{2f(\theta + \theta') + \Delta x + \frac{d}{2}}{\sqrt{\left[2f(\theta + \theta') + \Delta x + \frac{d}{2}\right]^2 + f^2}}$$

where NA is the number of aperture of the lens, f is the focal distance of the lens, $\theta$ is the inclination angle of the information recording medium plane with respect to the plane normal to the center light beam of the 0-order diffracted light (principal beam), $\theta'$ is the diffraction angle of the ±1-order diffracted lights, $\Delta x$ is the distance between the center light beam of the ±1-order diffracted lights (secondary beams) and the 0-order diffracted light (principal beam) on the aperture plane (pupil plane) of the lens, and d is the light beam diameter of the ±1-order diffracted lights applied to the aperture plane (pupil plane) of the lens. The angles $\theta$ and $\theta'$ are represented in radian. The light beam diameters of the 0-order diffracted light and the ±1-order diffracted lights are usually equal.

When a single beam system such as a push-pull system is used instead of the three-beam system, a lens which meets $$NA > \frac{2f\theta + \frac{d'}{2}}{\sqrt{\left(2f\theta + \frac{d'}{2}\right)^2 + f^2}}$$

may be used, where NA is the number of aperture of the lens, f is the focal distance of the lens, $\theta$ is the inclination angle of the information recording medium plane with respect to the plane normal to the center light beam of the laser beam applied to the medium plane, and d' is the light beam diameter of the laser beam applied to the aperture plane (pupil plane) of the lens. The angles $\theta$ is represented in radian.

The present invention is not limited to the above embodiment but various applications thereof may be made. In the optical card information recording and reproducing apparatus of the embodiment, the present invention is particularly effective because the tracking error is easy to occur due to the characteristic of the medium of the optical card (which is easy to warp or bend), although the present invention may be equally effective in digital audio disk apparatus, video disk apparatus or other optical information recording and reproducing apparatus.

In accordance with the optical information recording and reproducing apparatus of the present invention, the stable auto-tracking is attained by selecting the number of aperture NA of the optical system to be larger than $0.82\lambda/\omega 0$, where $\omega$ is the wavelength of the semiconductor laser, and $\omega_0$ is the diameter of the laser beam spot focused on the optical information recording medium of the optical system.

I claim:

1. An optical information recording and reproducing apparatus comprising:
    a laser light source having a Gaussian intensity distribution of an emitted laser beam;
    an optical system for focusing the laser beam emitted from said laser light source, having a number of aperture NA represented by $$NA > \frac{0.82 \times \lambda}{\omega_0}$$

where $\lambda$ is a wavelength of the laser beam emitted by said laser light source, and $\omega_0$ is a diameter of a laser beam spot focused by said optical system.

2. An optical information recording and reproducing apparatus according to claim 1 wherein said laser light source is a semiconductor laser.

3. An optical information recording and reproducing apparatus according to claim 1 further comprising conversion means arranged in a light path between said laser light source and said optical system for collimating the radiated laser beam emitted from said laser light source into a collimated laser beam.

* * * * *